C. L. SPIELMAN.
Stalk-Choppers.
No. 136,106. Patented Feb. 18, 1873.
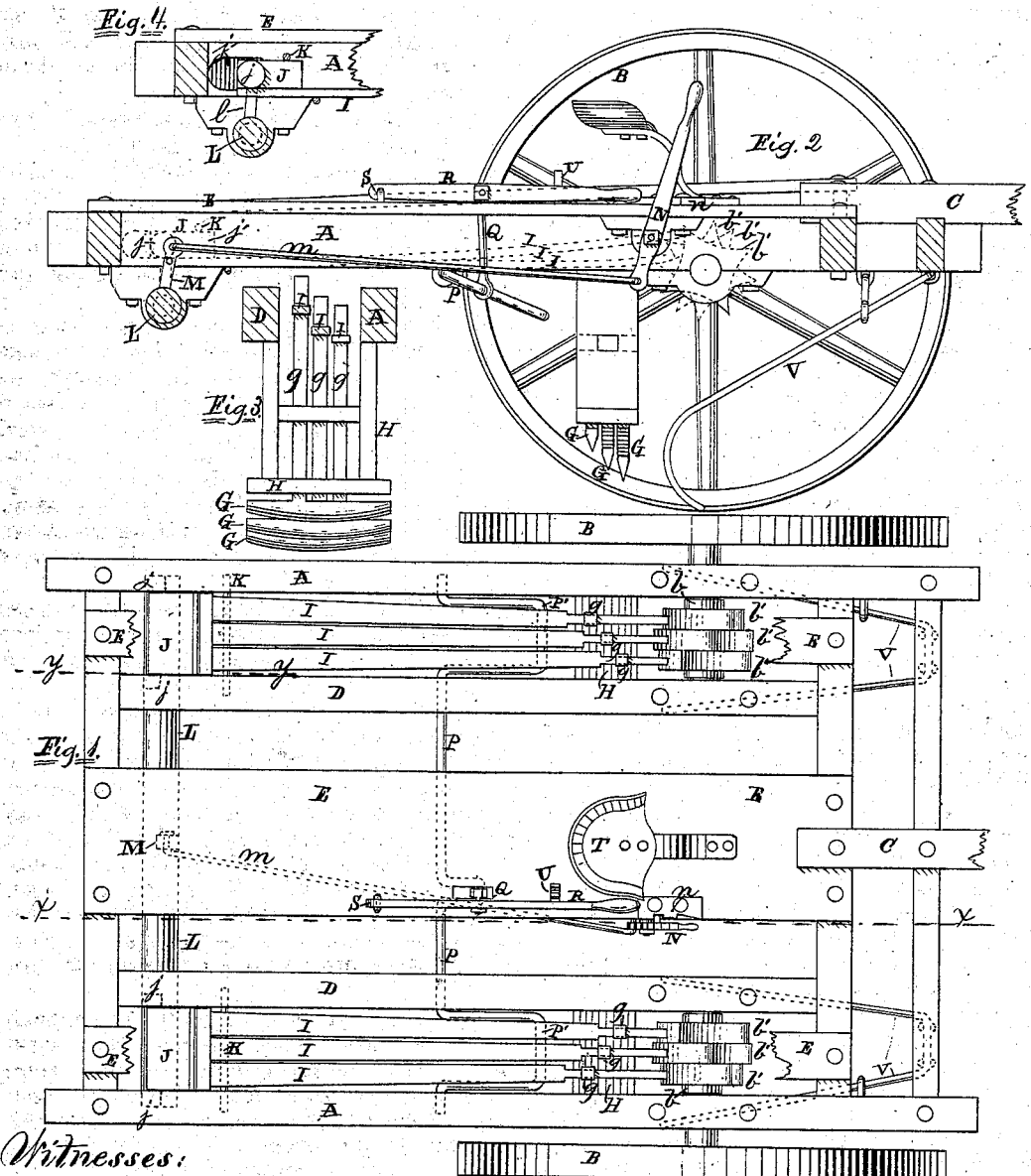
Witnesses:
Platt R. Richards
M. H. Barringer
Inventor:
Charles L. Spielman,
by W. B. Richards, atty.

UNITED STATES PATENT OFFICE.

CHARLES L. SPIELMAN, OF BLANDINSVILLE, ILLINOIS.

IMPROVEMENT IN STALK-CHOPPERS.

Specification forming part of Letters Patent No. 136,106, dated February 18, 1873.

*To all whom it may concern:*

Be it known that I, CHARLES L. SPIELMAN, of Blandinsville, in the county of McDonough and State of Illinois, have invented a certain Improvement in Stalk-Choppers, of which the following is a specification:

My invention has for its object to furnish a machine for cutting up corn-stalks into short lengths suitable for being plowed under; and the invention consists, first, in the construction and arrangement of the cutters, and the combination therewith of the devices for giving said cutters a chopping motion. Second, it consists in arranging the cutters and their handles in such manner that the cutters may be elevated and thrown out of gear for convenience in moving from place to place, &c., all as hereinafter fully described.

Figure 1 is a top or plan view of a machine embodying my invention. Fig. 2 is a vertical sectional view of Fig. 1 on the line $x\ x$. Fig. 3 is a rear view of the cutters; and Fig. 4 is a detached view of the rear end of the cutter-bars on the line $y\ y$ of Fig. 1.

A A represent a rectangular frame supported on wheels B B, and provided with a draft-pole, C. D D are bars framed longitudinally in the frame A A. E E E are boards covering the frame A. Each of the wheels B B has an independent shaft, $b$, carrying tappets $b'\ b'\ b'$. G G G are the cutters, three to each set, each having an arm, $g$, extending upward, and all supported by guides H H. I I I are spring-bars, one to each cutter, and its forward end passing through a hole in the upper end of the cutter-arm. Each set I I I of the spring-bars is attached at the rear end to a block, J. The rear side of each block J contains projections or pins $j\ j$, (see Fig. 4,) which slide back or forth, as desired, in slots $j'\ j'$ in the bars A and D. K is a rod or bar across and between the bars A and D, and arranged in such manner that when the block J is drawn forward, as shown at Fig. 4, its forward side will come beneath the rod K, holding the block J securely, and giving the full force of the spring-bars I to the stroke when their forward ends are raised.

It will be evident, from an inspection of Fig. 4, that if the block J is carried back until the forward side is drawn from the rod K the spring-bars may be elevated, and will only drop with their own weight and the weight or the cutters.

L is a rock-shaft, arranged transversely with and beneath the rear end of the frame A. $l\ l$ are arms extending from the shaft L to recesses in the under side of the blocks J J. M is a crank on the shaft L. $m$ is a rod extending from the crank M forward to the lower end or a lever, N. $n$ is a rack-bar for the upper end of the lever N.

By drawing the upper end of the lever N forward it will be plainly seen that the blocks J J will be drawn forward and beneath the rods K, and, at the same time, the forward ends of the spring-bars I be drawn forward and in contact with the tappets $b'$, and the machine be in working order or ready for operation in the field, the tappets $b'$ elevating the cutters alternately, and cutting the stalks into very short lengths by the rapid motion of the cutters.

P is a treble-cranked bar extending across the machine, with suitable bearings in the frame-pieces, and so arranged that the end cranks P' P' rest below the sets of arms I I I, one below each set; and the central crank is connected, by a rod, Q, with the central part of a lever, R, one end of which is pivoted at S to the upper side of one of the covering-boards E; and the other end comes up within easy reach of the driver's seat T. U is a post on which the free end of the lever R may be supported when desired. V V are the drag-hooks, pivoted to and suspended from the forward part of the frame A for the purpose of drawing the stalks into a favorable position for cutting.

The further operation of my invention than that already described is as follows: The working position of the spring-bars I and the cutters is hereinbefore described. It will be seen that, by means of the lever N, rod $m$, crank M, rock-shaft L, and arms or cranks $l$, that the blocks J J may be drawn back from beneath the bars K K, thus releasing them and withdrawing all close retention of the spring-bars, and at the same time drawing back the forward ends of the spring-bars from contact with the tappets b' b' b', and, while in this position, the forward end of the lever R may be elevated and supported on the post U, the cranks P' P', by the same operation, elevating each set of spring-bars I at their forward ends, and thereby elevating the cutters G clear of the ground and into suitable position for conveying the machine from field to field.

Claims.

1. The combination of the wheel-shafts b provided with tappets b', and the adjustable spring arms I carrying the vertical cutters G, substantially as and for the purpose specified.

2. The combination of the crank-lever P and lever R with shaft L, adjustable blocks J, crank M, connecting-rod m, and lever N, substantially as and for the purpose specified.

CHARLES L. SPIELMAN.

Witnesses:
A. W. BERGGREN,
PLATT R. RICHARDS.